US008418160B2

(12) United States Patent
Doyle

(10) Patent No.: US 8,418,160 B2
(45) Date of Patent: Apr. 9, 2013

(54) APPARATUS AND METHOD TO SELECTIVELY REMOVE MEMOIZING FUNCTIONS FROM PROGRAM CODE

(75) Inventor: Patrick R. Doyle, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 12/903,672

(22) Filed: Oct. 13, 2010

(65) Prior Publication Data

US 2012/0096448 A1  Apr. 19, 2012

(51) Int. Cl.
*G06F 9/45* (2006.01)
(52) U.S. Cl. ........ 717/159; 717/140; 717/141; 717/151; 717/154
(58) Field of Classification Search .......................... None
See application file for complete search history.

(56) References Cited

U.S. PATENT DOCUMENTS

| | | | |
|---|---|---|---|
| 6,484,188 B1 * | 11/2002 | Kwong et al. | 1/1 |
| 8,108,848 B2 * | 1/2012 | Meijer et al. | 717/151 |
| 2008/0235674 A1 * | 9/2008 | Gao et al. | 717/141 |
| 2009/0049421 A1 | 2/2009 | Meijer et al. | |
| 2010/0095066 A1 * | 4/2010 | Rodgers et al. | 711/125 |

FOREIGN PATENT DOCUMENTS

WO  WO0144922 A2  6/2001

OTHER PUBLICATIONS

Acar et al., "Selective Memoization," ACM, copyright 2003.*

* cited by examiner

*Primary Examiner* — Insun Kang
(74) *Attorney, Agent, or Firm* — Nelson and Nelson; Daniel P. Nelson; Alexis V. Nelson

(57) ABSTRACT

A method to selectively remove memoizing functions from computer program code includes initially locating a memoizing function call in the program code. The method then replaces the memoizing function call with a simple object allocation. Using escape analysis, the method determines whether the replacement is legal. If the replacement is not legal, the method removes the simple object allocation and reinserts the original memoizing function call in its place. If the replacement is legal, the method retains the simple object allocation in the program code. If desired, certain compiler optimizations, such as stack allocation and scalarization, may then be performed on the simple object allocation. A corresponding computer program product and apparatus are also disclosed.

20 Claims, 5 Drawing Sheets

200a

```
Record getRecord(arguments){
        return new Record(arguments);
}
```

200b

```
Record getRecord(arguments){
      if(!resultTable.contains(arguments))
            resultTable[arguments] = new Record(arguments);
      return resultTable[arguments];
}
```

APPARATUS AND METHOD TO SELECTIVELY REMOVE MEMOIZING FUNCTIONS FROM PROGRAM CODE

BACKGROUND

1. Field of the Invention

This invention relates to compiler optimizations for improving the performance of program code.

2. Background of the Invention

Memoization is a code optimization technique used to speedup functions that return the same value when provided the same parameters. To improve speed, a memoized function typically caches a result that is calculated for a specific set of inputs. Rather than recalculating the result upon receiving the same set of inputs, subsequent calls to the memoized function are configured to return the cached result. This eliminates or reduces the primary cost of a call with a specific set of inputs for all but the first call made to the function using the specific set of inputs.

Memoization can also be used to cause a request for an identical object to return the same object returned by prior requests. This form of memoization is also called "interning," and permits object equivalence to be tested using object identity tests, which are typically less computationally intensive than equivalence tests comparing each of the object's fields. For example, Java's autoboxing feature for integers is designed to return the same Integer object for small integers near zero (e.g., integers between −128 and +127). Not only does this stop the proliferation of Integer objects for these common values, it also permits them to be compared using an object identity comparison (which is less computationally intensive) rather than comparing the object's fields (which is more computationally intensive).

Nevertheless memoization is not without its drawbacks. In some cases, memoized functions may actually hurt, as opposed to help, performance. For example, certain memoized functions may be unable to benefit from compiler optimizations, such as stack allocation and scalarization.

In view of the foregoing, what are needed are apparatus and methods to selectively remove memoizing logic that harms performance. Further needed are apparatus and methods to determine, using escape analysis, whether removing such memoizing functions is legal. Such apparatus and methods would ideally enable certain compiler optimizations, such as stack allocation and scalarization, to be more fully utilized.

SUMMARY

The invention has been developed in response to the present state of the art and, in particular, in response to the problems and needs in the art that have not yet been fully solved by currently available apparatus and methods. Accordingly, the invention has been developed to provide apparatus and methods to selectively remove memoizing functions from program code. The features and advantages of the invention will become more fully apparent from the following description and appended claims, or may be learned by practice of the invention as set forth hereinafter.

Consistent with the foregoing, a method to selectively remove memoizing functions from computer program code is disclosed herein. In one embodiment, such a method includes locating a memoizing function call in program code. The method then replaces the memoizing function call with a simple object allocation. Using escape analysis, the method determines whether the replacement is legal. If the replacement is not legal, the method removes the simple object allocation and reinserts the original memoizing function call in its place. If the replacement is legal, the method retains the simple object allocation in the program code. If the simple object allocation is retained, certain compiler optimizations, such as stack allocation and scalarization, may be performed.

A corresponding computer program product and apparatus are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
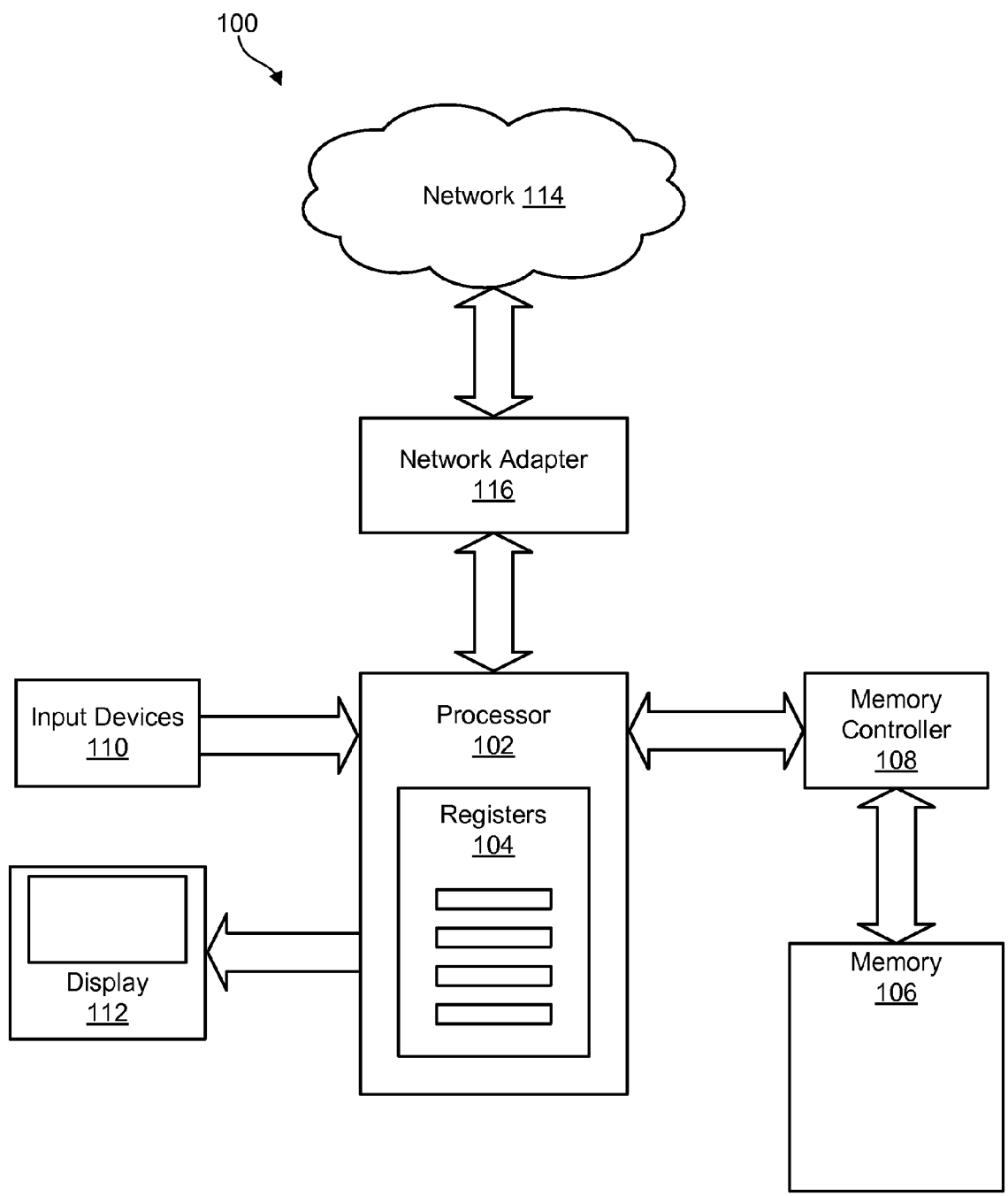
FIG. 1 is a high-level block diagram showing one example of a computer system suitable for use with an embodiment of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to various embodiments of the invention. It will be understood that each block of the flowchart illustrations and/or block diagrams, and combinations of blocks in the flowchart illustrations and/or block diagrams, may be implemented by computer program instructions or code. The computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a computer system 100 is illustrated. The computer system 100 is presented to show one example of an environment where an apparatus and method in accordance with the invention may be implemented. The computer system 100 is presented only by way of example and is not intended to be limiting. Indeed, the apparatus and methods disclosed herein may be applicable to a wide variety of different computer systems in addition to the computer system 100 shown. The apparatus and methods disclosed herein may also potentially be distributed across multiple computer systems 100.

The computer system 100 includes at least one processor 102 and may include more than one processor. The processor 102 includes one or more registers 104 storing data describing the state of the processor 102 and facilitating execution of software systems. The registers 104 may be internal to the processor 102 or may be stored in a memory 106. The memory 106 stores operational and executable data that is operated upon by the processor 102. The memory 106 may be accessed by the processor 102 by means of a memory controller 108. The memory 106 may include volatile memory (e.g., RAM) as well as non-volatile memory (e.g., ROM, EPROM, EEPROM, hard disks, flash memory, etc.).

The processor 102 may be coupled to additional devices supporting execution of software and interaction with users. For example, the processor 102 may be coupled to one or more input devices 110, such as a mouse, keyboard, touch screen, microphone, or the like. The processor 102 may also be coupled to one or more output devices such as a display device 112, speaker, or the like. The processor 102 may communicate with one or more other computer systems by means of a network 114, such as a LAN, WAN, or the Internet. Communication over the network 114 may be facilitated by a network adapter 116.

Figure 2A:
FIG. 2A shows one example of a simple Java function.
Figure 2B:
FIG. 2B shows the simple Java function of FIG. 2A after it has been memoized.

Referring to FIGS. 2A and 2B, as previously mentioned, memoization may be used to speed up functions that return the same value when provided the same parameters. FIG. 2A shows one example of a simple Java function 200a (or Java method 200a) and FIG. 2B shows how the same Java function might appear after memoization. Although the illustrated functions 200a, 200b are written in Java, it should be noted that the apparatus and methods discussed herein may be applicable to a wide variety of different programming languages in addition to Java.

As shown in FIG. 2A, the first line of the Java function 200a includes a function call "getRecord" taking one or more arguments. The second line of the Java function 200a is a return type that creates a new object whose class is "Record." Such a function 200a may be used, for example, to retrieve an employee record object from a database given certain arguments, such as the employee's name or identification number. In such an example, the second line of the Java function 200a would create a new employee record object, invoke the appropriate constructor function to populate it according to the arguments that are given, and return it. The second line of the Java function 200a is also referred to as an object allocation statement.

Instead of generating a new object each time the Java function 200a is called, the Java function 200a may be memoized to appear more like the Java function 200b illustrated in FIG. 2B. This Java function 200b first determines whether the object being requested is in a table (i.e., "resultTable") acting as cache. If the object is in the table, the function 200b returns the object from the table rather than generating a new object. If the object is not in the table, the function 200b generates a new object, stores it in the table, and then returns this object in response to the function call. In this way, the memoized function 200b caches objects so that they can be retrieved later when the same set of arguments (or parameters) are received, rather than always generating new objects (which can be more computationally intensive). In this way, the memoized function 200b is intended to improve the speed of the non-memoized function 200a.

Nevertheless, as previously explained, a memoized function 200b like that illustrated in FIG. 2A is not without its drawbacks. In some cases, memoized functions may harm instead of help performance. For example, when the Java function 200a is inlined into a caller, it becomes a simple object allocation. If escape analysis can prove that the resulting object does not "escape," the object may be safely allocated on the stack instead of the heap, and perhaps even scalarized to entirely eliminate the object. This can significantly improve the performance of the function 200a.

However, when the function 200a is memoized, such as is illustrated in FIG. 2B, several undesirable things occur: First, the memoized function 200b stores the object in a table, which becomes an object "escape." This prevents the object from being stack-allocated and taking advantage of the performance gains that are possible with stack allocation. Second, the memoized function 200b loads the object from the table on one control path, which inhibits scalarization, a very useful optimization. Since all uses of the resulting object are reachable from two definitions (the allocation, and the load from the table), the object returned from the memoized function is no longer provably a local allocation. This inhibits optimizations on program code that comes after the call to the memoized function. Because access to an object's fields cannot be proven to originate from any one particular object, access to the object's fields typically must take place through indirect loads and stores. This would preclude the use of scalarization, which converts indirect loads and stores to direct loads and stores.

For the reasons cited above, memoization is not always advantageous and may actually be disadvantageous in many cases. Consequently, it would be an advance in the art to provide apparatus and methods to selectively remove memoizing functions that harm performance from program code. It would be a further advance in the art to provide apparatus and methods to determine whether removing such memoizing functions is legal. Such apparatus and methods would ideally enable certain compiler optimizations, such as stack allocation and scalarization, to be more fully utilized.

Figure 3A:
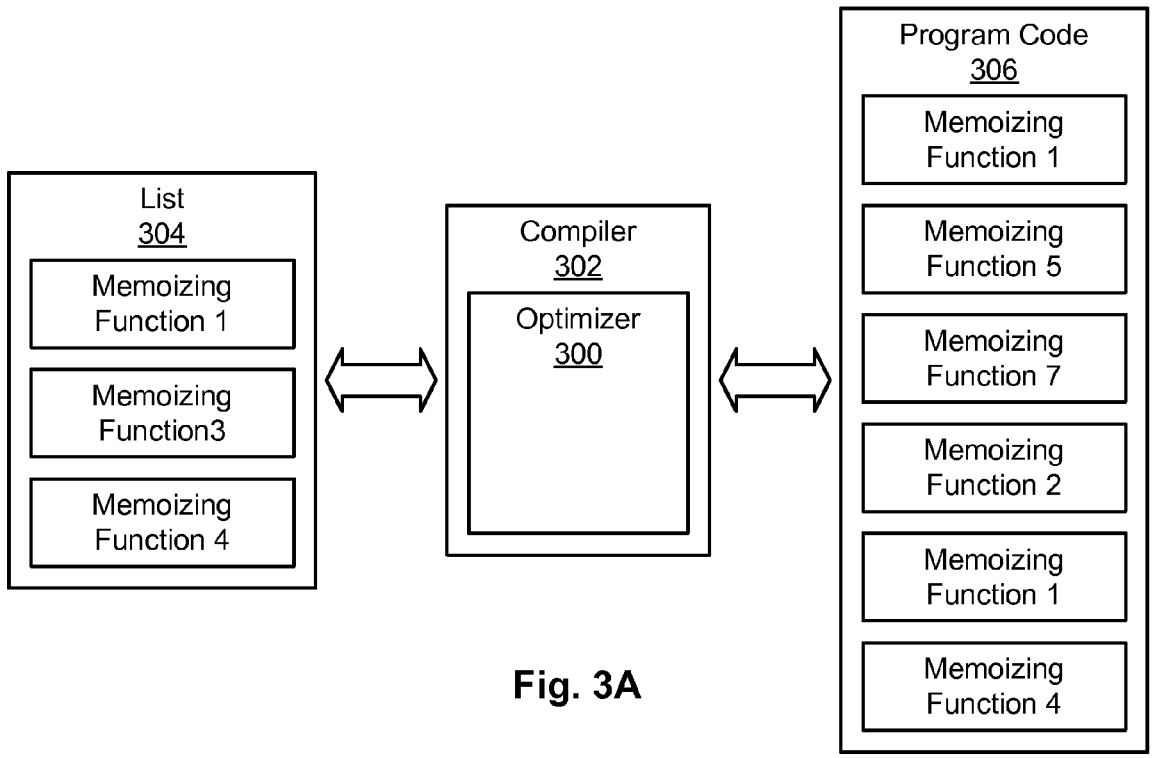
FIG. 3A is a high-level block diagram showing the operation of an optimizer configured to selectively remove certain memoizing functions from program code.

Referring to FIG. 3A, in selected embodiments, an optimizer 300 in accordance with the invention may be configured to selectively remove memoizing functions from program code 306. The optimizer 300 may be a stand-alone application 300, or be incorporated into a compiler 302 or other application 302. As shown, the optimizer 300 interfaces with a list 304 of memoizing functions that are targeted for removal from program code 306. The entries in the list 304 may be determined and entered manually by a user, or alternatively, be determined and entered using some automated analysis.

The memoizing functions in the list 304 may be those that are determined to harm the performance of the program code 306. For example, if certain memoizing functions could be replaced with simple object allocations and then optimized to improve performance, these memoizing functions may be deemed to harm performance. Such memoizing functions may be added to the list 304 to indicate that they should be removed from the program code 306 and replaced with simple object allocations. Other memoizing functions that are deemed to harm performance but whose removal would violate the requirements of a programming language's specification or are illegal for another reason may be omitted from the list 304. Alternately, these memoizing functions may be included in the list 304 for removal from the program code. These memoizing functions may then be reinserted into the program code 306 once it is determined that their removal is illegal or has violated one or more rules, or harms performance. Other cases that may warrant omitting a memoizing function from the list 304 include: cases where a memoizing function's table is used for operations other than the memoization operation; and cases where a memoizing function's constructor has certain side-effects or operations that depend on object identity.

Figure 3B:
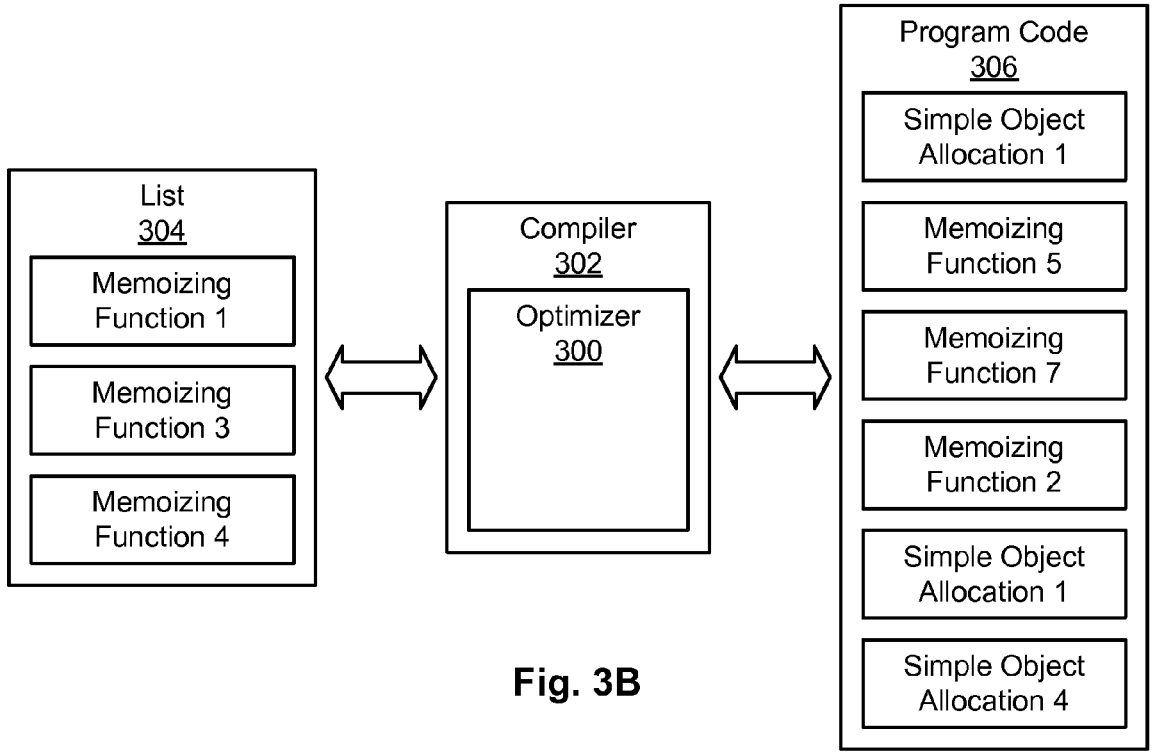
FIG. 3B is a high-level block diagram showing the program code of FIG. 3A after the memoizing functions have been removed and replaced with simple object allocations.

Referring again to FIG. 3A, using the list 304, the optimizer 300 analyzes the program code 306 and removes each of the memoizing function calls that are referenced in the list 304. In this example, the optimizer 300 would remove each instance of "memoizing function 1," "memoizing function 3," and "memoizing function 4" that it finds in the program code 306. The optimizer 300 may replace these memoizing function calls with equivalent simple object allocations or other suitable code, as illustrated in FIG. 3B, and then determine whether the replacements are legal. The simple object allocations that are legal may be retained in the program code 306. These simple object allocations may be optimized using techniques such as stack allocation, scalarization, or the like. A more detailed description of the operation of the optimizer 300 is provided in FIGS. 4 and 5 and accompanying text.

Figure 4:
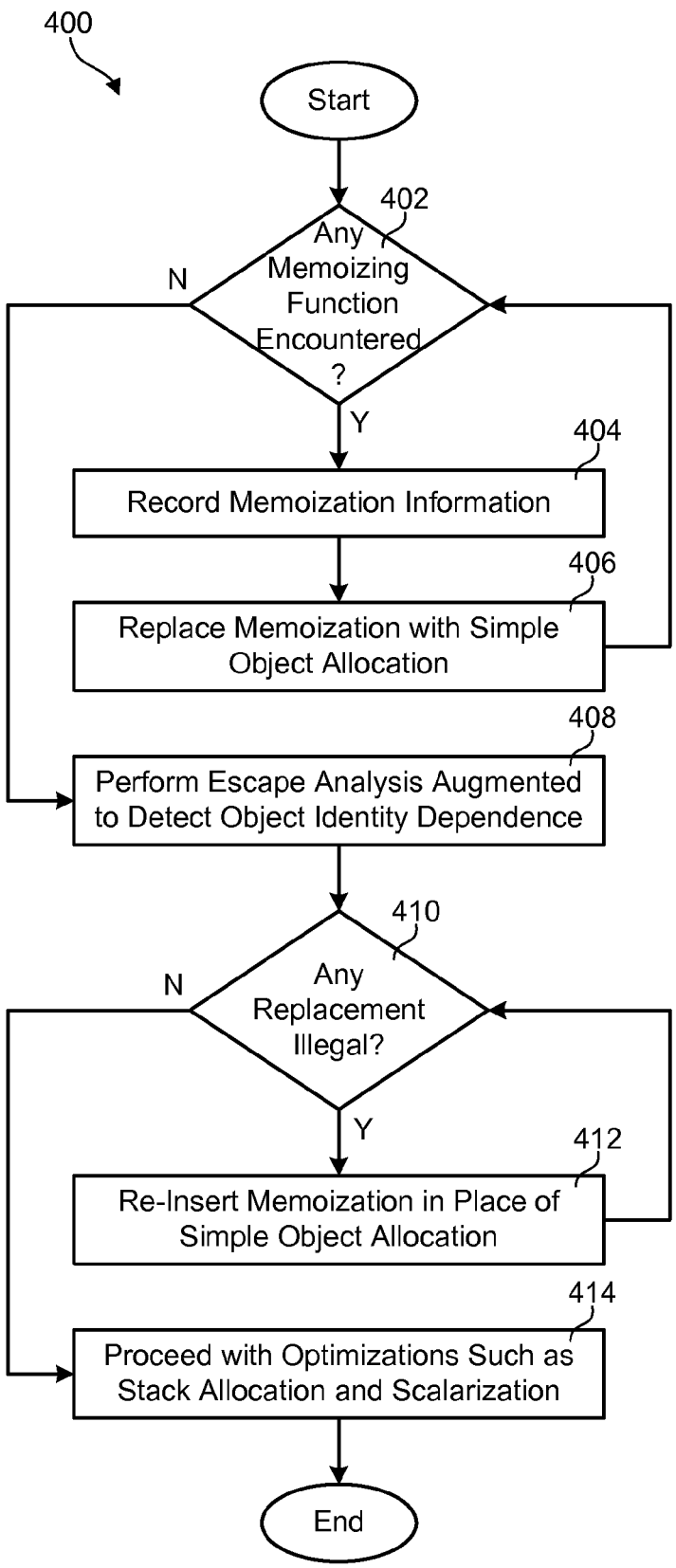
FIG. 4 is a flow diagram showing one embodiment of a method for selectively removing memoizing functions from program code.

Referring to FIG. 4, one embodiment of a method 400 for selectively removing memoizing function calls from program code is illustrated. Such a method 400 may be executed by the optimizer 300 previously discussed. As illustrated, while analyzing program code 306, the method 400 determines 402 whether a memoizing function call has been encountered in the program code 306, such as to a memoizing function referenced in a list 304. If the method 400 encounters 402 a memoizing function call, the method 400 records 404 information about the memoizing function call, such as the location of the memoizing function, and its associated constructor call, as well as code used to implement the memoizing function. The method 400 then replaces 406 the memoizing function call with an equivalent simple object allocation followed by a call to the same constructor used by the memoizing function. The method 400 then performs 408 escape analysis on the program code, which has been augmented to detect object identity dependence.

The method 400 then determines 410 whether each replacement performed at step 406 is legal. The determination step 410 may include determining whether the object established by the simple object allocation "escapes" (i.e., whether a reference to the object can reach code in another method or thread outside the scope of the optimizer's analysis). Such a determination may ignore apparent escapes that occur via a constructor call (which is used to initialize the object's fields). The determination step 410 may also include determining whether the object is referenced by an operation that depends on object identity (such as pointer comparisons or identity hash functions). It should be noted, however, that checking for operations that depend on object identity may only be necessary if the programming language specification mandates memoization. If not mandated, these checks may be omitted since the results of the pointer comparisons are undefined by the specification. Thus, altering their operation will cause little or no harm.

If, at step 410, the method 400 determines that a replacement is illegal (i.e., the object created by a simple object allocation "escapes" or is referenced by an operation that depends on object identity), the method 400 reinserts 412 the original memoizing function call in place of the simple object allocation. This may be accomplished using the information (e.g., location information, etc.) recorded at step 404. Steps 410, 412 may be repeated until all illegal replacements are reverted (i.e., "rememoized") to their original memoizing function calls. If, at step 410, the method 400 determines that a replacement is legal, the method 400 retains the simple object allocation. It will be appreciated that reverting a memoization at this stage is straightforward because no additional code transformations have occurred since the memoization was performed; hence it is straightforward to locate and revert the memorizing function call.

Once all illegal replacements are reverted to their original memoizing function calls, the method 400 may proceed 414 to optimize the program code 306, and more specifically the simple object allocations that have been retained in the program code 306. This may include using optimization techniques such as stack allocation and scalarization on the simple object allocations. Scalarizing an object may allow the object to be eliminated entirely. This may enable the object's fields to be loaded into registers and manipulated directly by the hardware, thereby providing a significant performance improvement. For example, in the case of the java/lang/Integer class, scalarizing the objects allows the objects to be eliminated entirely, turning operations on java/lang/Integer objects into simple operations on integers. These integers may then take advantage of various high-impact optimizations, such as register-allocation and constant folding. This, in turn, reduces heap usage and cache footprint.

The method 400 presented in FIG. 4 is presented only by way of example and is not intended to be limiting. One of skill in the art will recognize that various modifications may be made to the method 400 without departing from the essence or primary characteristics of the invention. Such modifications are intended to be encompassed with the scope of the invention. The method 400 is simply presented to show one method for selectively removing memoizing functions from program code.

Figure 5:
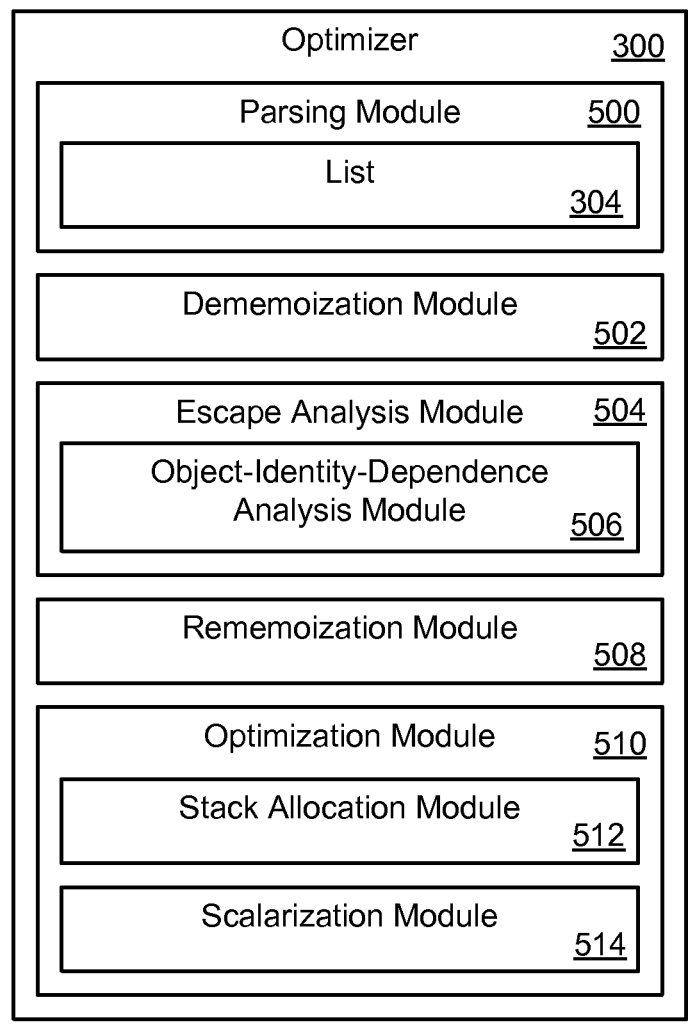
FIG. 5 is a high-level block diagram showing various modules that may be included in an optimizer in accordance with the invention.

Referring to FIG. 5, in selected embodiments, the optimizer 300 previously described may contain one or more modules to provide various features and functions. These modules may be implemented in hardware, software or firmware executable on hardware, or a combination thereof. These modules are presented only by way of example and are not intended to be limiting. Indeed, alternative embodiments may include more or fewer modules than those illustrated, or the modules may be organized differently. Furthermore, it should be recognized that, in some embodiments, the functionality of some modules may be broken into multiple modules or, conversely, the functionality of several modules may be combined into a single module or fewer modules.

As illustrated in FIG. 5, in selected embodiments, the optimizer 300 may include one or more of a parsing module 500, a dememoization module 502, an escape analysis module 504, a rememoization module 508, and an optimization module 510. In certain embodiments, the escape analysis module 504 includes an object-identity-dependence analysis module 506. Similarly, the optimization module 510 may include one or more of a stack allocation module 512 and a scalarization module 514.

The parsing module 500 may be used to locate memoizing function calls in the program code 306. If a list 304 is utilized, the parsing module 500 may locate memoizing function calls in the program code 306 that are referenced in the list 304. In other embodiments, the parsing module 500 locates all memoizing function calls in the program code, or locates memoizing function calls that satisfy some criteria or are identified using some analysis technique. Upon encountering an identified memoizing function call in the program code 306, the dememoization module 502 replaces the memoizing function call with an equivalent simple object allocation. This continues until all identified memoized function calls are replaced with simple object allocations.

An escape analysis module 504 then determines whether each replacement made by the dememoization module 502 is legal. To make this determination, the escape analysis module 504 determines whether an object generated by a simple object allocation "escapes" (can reach code in another method or thread outside the scope of the optimizer's analysis). In doing so, the escape analysis module 504 ignores apparent escapes occurring via constructor calls. An object-identity-dependence analysis module 506, which may be included in the escape analysis module 504, may determine whether objects are referenced by one or more operations that depend on object identity.

If an object escapes or is referenced by an operation that depends on object identity (indicating that the simple object allocation is illegal), a rememoization module 508 reverses the replacement by reinserting the original memoized function call in place of the simple object allocation. If the object does not escape and is not referenced by an operation that depends on object identity (indicating that the simple object allocation is legal), the simple object allocation is retained in the program code 306. Once all simple object allocations are either reverted to their original memoizing function calls or are retained in the program code 306, an optimization module 510 proceeds to perform various optimizations on the simple object allocations that have been retained. For example, a stack allocation module 512 may allocate objects on the stack if such optimizations are desirable. Similarly, a scalarization module 514 may scalarize objects if such optimizations are desirable.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in a block may occur out of the order noted in the Figures. For example, two blocks shown in succession may, in fact, be executed substantially concurrently, or the blocks may sometimes be executed in the reverse order, depending upon the functionality involved. Some blocks may be deleted or other blocks may be added depending on the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method to selectively remove memoizing functions from program code, the method comprising:
   locating, by a processor, a memoizing function call in program code;
   replacing, by the processor, the memoizing function call with a simple object allocation;
   determining, using escape analysis, whether the replacement is legal;
   if the replacement is not legal, removing, by the processor, the simple object allocation and reinserting the memoizing function call in place of the simple object allocation; and
   if the replacement is legal, retaining, by the processor, the simple object allocation in the program code.

2. The method of claim 1, wherein determining whether the replacement is legal comprises determining whether the object "escapes."

3. The method of claim 2, wherein determining whether the object "escapes" comprises ignoring apparent escapes via a constructor call.

4. The method of claim 1, wherein determining whether the replacement is legal comprises determining whether the object is referenced by an operation that depends on object identity.

5. The method of claim 1, wherein retaining the simple object allocation further comprises allocating the object on a stack.

6. The method of claim 1, wherein retaining the simple object allocation further comprises scalarizing the object.

7. The method of claim 1, wherein locating the memoizing function call comprises locating a memoizing function call belonging to a pre-determined list.

8. A computer program product to selectively remove memoizing functions from program code, the computer program product comprising a non-transitory computer-readable storage medium having computer-usable program code embodied therein, the computer-usable program code comprising:
   computer-usable program code to locate a memoizing function call in program code;
   computer-usable program code to replace the memoizing function call with a simple object allocation;
   computer-usable program code to determine, using escape analysis, whether the replacement is legal;
   computer-usable program code to remove the simple object allocation and reinsert the memoizing function call in place of the simple object allocation if the replacement is not legal; and
   computer-usable program code to retain the simple object allocation in the program code if the replacement is legal.

9. The computer program product of claim 8, wherein determining whether the replacement is legal comprises determining whether the object "escapes."

10. The computer program product of claim 9, wherein determining whether the object "escapes" comprises ignoring apparent escapes via a constructor call.

11. The computer program product of claim 8, wherein determining whether the replacement is legal comprises determining whether the object is referenced by an operation that depends on object identity.

12. The computer program product of claim 8, wherein retaining the simple object allocation further comprises allocating the object on a stack.

13. The computer program product of claim 8, wherein retaining the simple object allocation further comprises scalarizing the object.

14. The computer program product of claim 8, wherein locating the memoizing function call comprises locating a memoizing function call belonging to a pre-determined list.

15. An apparatus to selectively remove memoizing functions from program code, the apparatus comprising:
   a plurality of modules implemented in at least one of hardware and a combination of hardware and software, the plurality of modules comprising:
      a parsing module to locate a memoizing function call in program code;
      a dememoization module to replace the memoizing function call with a simple object allocation;
      an escape analysis module to determine whether the replacement is legal and, if the replacement is legal, retain the simple object allocation in the program code; and
      a rememoization module to remove the simple object allocation and reinsert the memoizing function call in its place if the replacement is not legal.

16. The apparatus of claim 15, wherein the escape analysis module determines whether the object "escapes."

17. The apparatus of claim 16, wherein the escape analysis module ignores apparent escapes via a constructor call.

18. The apparatus of claim 15, wherein the escape analysis module comprises an object-identity-dependence analysis module to determine whether the object is referenced by an operation that depends on object identity.

19. The apparatus of claim 15, further comprising a stack allocation module to allocate an object on a stack if the replacement is legal.

20. The apparatus of claim 15, further comprising a scalarization module to scalarize an object if the replacement is legal.

* * * * *